US012755731B2

(12) United States Patent
Xu

(10) Patent No.: US 12,755,731 B2
(45) Date of Patent: Oct. 6, 2026

(54) AUDIO PROCESSING METHOD AND APPARATUS, AND ELECTRONIC DEVICE PERFORMING AUDIO DEDUPLICATION

(71) Applicant: VIVO MOBILE COMMUNICATION CO., LTD., Guangdong (CN)

(72) Inventor: Lubo Xu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 520 days.

(21) Appl. No.: 18/343,055

(22) Filed: Jun. 28, 2023

(65) Prior Publication Data

US 2023/0343325 A1 Oct. 26, 2023

Related U.S. Application Data

(63) Continuation of application No. PCT/CN2021/143036, filed on Dec. 30, 2021.

(30) Foreign Application Priority Data

Dec. 30, 2020 (CN) ........................ 202011604816.7

(51) Int. Cl.
*G10L 15/04* (2013.01)
*G10L 15/05* (2013.01)
(Continued)

(52) U.S. Cl.
CPC .............. *G10L 15/05* (2013.01); *G10L 25/93* (2013.01); *G10L 15/04* (2013.01)

(58) Field of Classification Search
CPC . G11B 20/10; G11B 20/10527; G11B 27/031; G11B 27/10; G11B 2020/10546;
(Continued)

(56) References Cited

U.S. PATENT DOCUMENTS 8,041,565 B1 * 10/2011 Bhardwaj ............... G10L 15/28
704/235
9,182,940 B1 11/2015 Chen et al.
(Continued)

FOREIGN PATENT DOCUMENTS

CN 102811182 A 12/2012
CN 103970477 A 8/2014
(Continued)

OTHER PUBLICATIONS

Extended European Search Report for Application No. 21914619.8, dated Jun. 5, 2024, 9 Pages.
(Continued)

*Primary Examiner* — Farzad Kazeminezhad
(74) *Attorney, Agent, or Firm* — BROOKS KUSHMAN P.C.

(57) ABSTRACT

An audio processing method and apparatus, and an electronic device, and belongs to the field of audio technologies. The method includes: determining, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and segmenting the first audio according to the first location to obtain a second audio segment and a third audio segment.

12 Claims, 5 Drawing Sheets

(51) Int. Cl.

| | |
|---|---|
| ***G10L 15/28*** | (2013.01) |
| ***G10L 25/78*** | (2013.01) |
| ***G10L 25/93*** | (2013.01) |
| ***G11B 20/10*** | (2006.01) |
| ***G11B 27/031*** | (2006.01) |

(58) Field of Classification Search
CPC ........... G11B 2020/10972; G11B 2020/10981; G10L 25/78; G10L 25/93
USPC .......................................................... 704/235
See application file for complete search history.

(56) References Cited

U.S. PATENT DOCUMENTS

| | | | | |
|---|---|---|---|---|
| 9,589,596 | B2 | 3/2017 | Wang et al. | |
| 2007/0112562 | A1 | 5/2007 | Vainio | |
| 2008/0181417 | A1 | 7/2008 | Pereg et al. | |
| 2015/0356997 | A1 | 12/2015 | Wang et al. | |
| 2020/0007943 | A1 | 1/2020 | Filmeyer | |
| 2020/0380958 | A1* | 12/2020 | Srinivasan | G08G 5/76 |
| 2022/0269724 | A1 | 8/2022 | Gao et al. | |

FOREIGN PATENT DOCUMENTS

| | | | |
|---|---|---|---|
| CN | 104038827 | A | 9/2014 |
| CN | 104965872 | A | 10/2015 |
| CN | 107888757 | A | 4/2018 |
| CN | 110036442 | A | 7/2019 |
| CN | 111128254 | A | 5/2020 |
| CN | 111641551 | A | 9/2020 |
| CN | 112712825 | A | 4/2021 |
| KR | 20160003619 | A | 1/2016 |
| WO | 2002093801 | A2 | 11/2002 |

OTHER PUBLICATIONS

First Office Action for Korean Application No. 10-2023-7025661, dated May 21, 2024, 5 Pages.

First Office Action for Chinese Application No. 202011604816.7, dated Oct. 22, 2021, 12 Pages.

International Search Report and Written Opinion for Application No. PCT /CN2021/143036, dated Mar. 18, 2022, 9 Pages.

Second Indian Office Action for Indian Patent Application No. 202327047796 mailed Nov. 24, 2025. 2 pages.

* cited by examiner

AUDIO PROCESSING METHOD AND APPARATUS, AND ELECTRONIC DEVICE PERFORMING AUDIO DEDUPLICATION

CROSS-REFERENCE TO RELATED APPLICATIONS

This application is a continuation of PCT Application No. PCT/CN2021/143036 filed on Dec. 30, 2021, which claims priority to Chinese Patent Application No. 202011604816.7 filed on Dec. 30, 2020, which are incorporated herein by reference in their entireties.

TECHNICAL FIELD

This application relates to the field of audio technologies, and specifically, to an audio processing method and apparatus, and an electronic device.

BACKGROUND

During communication through social software, sending and receiving of an audio message are relatively common, particularly in a case that it is inconvenient for a user to input and read text. Currently, in a process of audio message playback, if playback is interrupted in a case that the audio message playback is not finished, when the user wants to continue to listen to the audio message, the user often needs to play the audio message from the beginning to the end again, which is a waste of time.

For the foregoing problem, in the prior art, an interruption location of audio playback is detected, and remaining audio is marked based on the interruption location to facilitate listening next time. However, in a process of implementing this application, the inventor finds that the prior art at least has the following problem: remaining audio starts to be marked based on the interruption location of audio playback, which may easily lead to poor content integrity of the marked remaining audio, for example, half a sentence is included.

SUMMARY

According to a first aspect, an embodiment of this application provides an audio processing method, including:

determining, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and segmenting the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio.

According to a second aspect, an embodiment of this application provides an audio processing apparatus, including:

a first determining module, configured to determine, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and a segmentation module, configured to segment the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio.

According to a third aspect, an embodiment of this application provides an electronic device. The electronic device includes a processor, a memory, and a program or instructions stored in the memory and executable on the processor, the program or the instructions, when executed by the processor, implementing the steps of the method according to the first aspect.

According to a fourth aspect, an embodiment of this application provides a readable storage medium. The readable storage medium stores a program or instructions, the program or the instructions, when executed by a processor, implementing the steps of the method according to the first aspect.

According to a fifth aspect, an embodiment of this application provides a chip. The chip includes a processor and a communication interface, the communication interface being coupled to the processor, and the processor being configured to run a program or instructions to implement the method according to the first aspect.

According to a sixth aspect, a computer program product is provided. The computer program product is stored in a non-volatile storage medium and executed by at least one processor to implement the method according to the first aspect.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application shall fall within the scope of this application.

In the specification and claims of this application, the terms "first" and "second" are used to distinguish similar objects, but are not used to describe a specific sequence or order. It should be understood that the terms so used may be interchanged in an appropriate condition, so that the embodiments of this application can be implemented in an order other than those illustrated or described herein. Objects distinguished by "first" and "second" are usually of one type, and the number of objects is not limited. For example, a first object may be one or more. In addition, "and/or" in the specification and claims denotes at least one of the connected objects, and the character "I" generally indicates an "or" relationship between the associated objects.

With reference to the accompanying drawings, the audio processing method disclosed in the embodiments of this application is described in detail through specific embodiments and application scenarios thereof.

Figure 1:
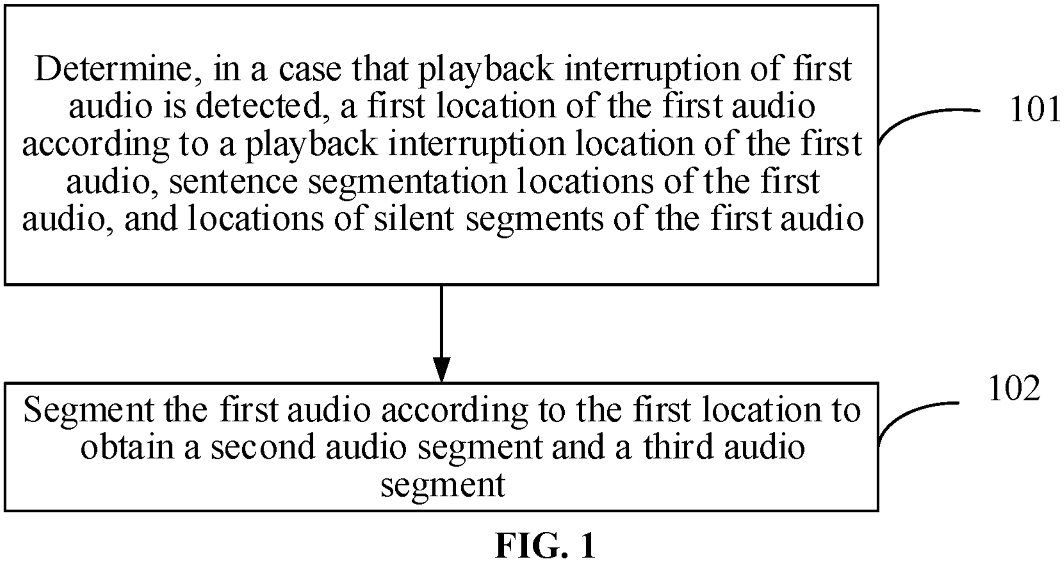
FIG. 1 is a flowchart of an audio processing method according to an embodiment of this application.

Referring to FIG. 1, FIG. 1 is a flowchart of an audio processing method according to an embodiment of this application. As shown in FIG. 1, the audio processing method includes the following steps:

Step 101. Determine, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio.

In this embodiment of this application, the first audio may be any audio, for example, an audio message, an audio file, or an audio part in a video. The playback interruption location may be understood as a playback interruption time point or a playback interruption moment of the first audio. For example, in a case that playback of the first audio is interrupted at the 5th second, the playback interruption location is the 5th second of the first audio. The first audio segment may refer to an audio segment between the start location of the first audio and the playback interruption location of the first audio, that is, a played audio segment in the first audio.

The sentence segmentation locations may refer to segmentation locations of sentences in the first audio. It should be noted that, the sentence segmentation locations may be understood as sentence segmentation time points or sentence segmentation moments of audio.

The silent segment may refer to a silent part in the first audio. The location of the silent segment may include a start location and the end location of the silent segment. It should be noted that, the start location of the silent segment may be understood as a start time point or a start moment of the silent segment, and the end location of the silent segment may be understood as an end time point or an end moment of the silent segment.

Optionally, the silent segments in the first audio may be detected through a voice activity detection (VAD) algorithm, where the VAD algorithm can classify frames in the audio into two types, one type is silent frames (that is, sil frames), and the other type is non-silent frames. A classification algorithm used by the VAD algorithm may include a filter algorithm or a neural network algorithm. Optionally, a silent part whose duration exceeds preset duration in the first audio may be determined as a silent segment. The preset duration may be properly set according to an actual requirement, for example, 1 second, 1.5 seconds, or 2 seconds.

Figure 2:
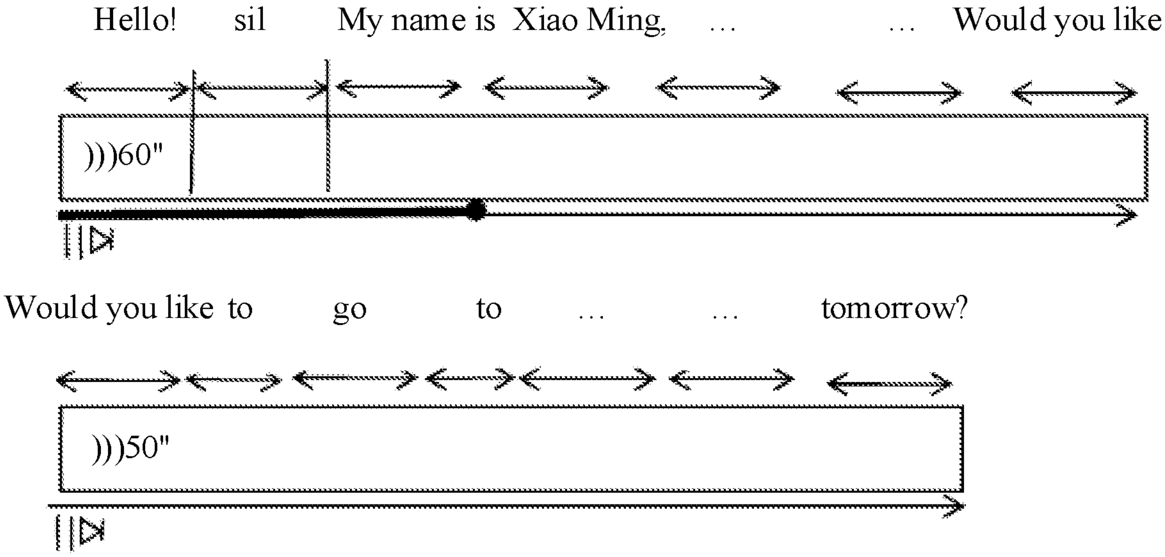
FIG. 2 is a schematic diagram of a sentence segmentation location and a location of a silent segment of audio according to an embodiment of this application.

Optionally, in this embodiment, the sentence segmentation locations and the locations of the silent segments of the first audio may be pre-marked. For example, as shown in FIG. 2, an audio part marked as sil is a silent segment. In this way, it is convenient to quickly find a sentence segmentation location or an end location of a silent segment that is closest to the playback interruption location of the first audio in the first audio segment of the first audio.

In step 101, a sentence segmentation location or an end location of a silent segment may be determined as the first location from the sentence segmentation locations and end locations of the silent segments of the first audio segment based on the playback interruption location of the first audio. For example, the sentence segmentation location or the end location of the silent segment that is closest to the playback interruption location in the first audio segment, or a sentence segmentation location or an end location of a silent segment that is away from the playback interruption location by a distance less than a preset distance in the first audio segment may be used as the first location.

Step 102. Segment the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio.

In this step, the first audio may be segmented into a third audio segment (that is, a played audio segment) and a second audio segment (that is, an unplayed audio segment) according to the first location, so that in a case that a user needs to continue to listen to an unplayed audio part in the first audio, the user can directly listen to the second audio segment, which saves time of the user. In addition, because the first audio is segmented based on the sentence segmentation location or the end location of the silent segment that is closest to the playback interruption location of the first audio, integrity of an audio segment obtained after segmentation can be improved.

For the audio processing method according to this embodiment of this application, in a case that playback interruption of first audio is detected, a first location of the first audio is determined according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and the first audio is segmented according to the first location to obtain a second audio segment and a third audio segment, which can improve integrity of an audio segment obtained after segmentation, so that the user understands content of the audio more easily in a case of continuing to listen to the second audio segment.

Optionally, the first location is a sentence segmentation location or an end location of a silent segment that is away from the playback interruption location by a first distance in the first audio segment, and the first distance is a smallest value among distances between sentence segmentation locations and end locations of silent segments of the first audio segment and the playback interruption location.

In this embodiment, the sentence segmentation location or the end location of the silent segment that is closest to the playback interruption location in the first audio segment may be used as the first location. For example, each word that is located before the playback interruption location in the played audio segment may be viewed. In a case that an end location of a previous word of the playback interruption location is a sentence segmentation location, or the previous word is a silent word, an end moment of the previous word may be used as a segmentation location of the audio. For example, as shown in FIG. 2, in a case that playback is interrupted when "My name is" is played, and a previous word is a silent word (that is, sil), an end location of the silent word may be used as the first location, that is, a segmentation location of the first audio.

In this embodiment of this application, the sentence segmentation location or the end location of the silent segment that is closest to the playback interruption location in the first audio segment is used as the first location to segment the first audio, which can not only improve integrity of the audio segment obtained after segmentation, but also improve accuracy of segmentation of the played part and the unplayed part of the first audio.

Optionally, before recognizing the first location closest to the playback interruption location of the first audio in the first audio segment of the first audio in a case that playback interruption of the first audio is detected, the method further includes:

recognizing text corresponding to the first audio;

marking an audio location corresponding to each word in the text;

performing sentence segmentation processing on the text to obtain a sentence segmentation processing result; and determining the sentence segmentation locations of the first audio according to the sentence segmentation processing result and the audio location corresponding to each word in the text.

In this embodiment, the first audio may be converted into text by a voice recognition algorithm, and the audio location corresponding to each word in the text is marked, for example, a start time point and an end time point of each word in the first audio in the text are marked.

Sentence segmentation processing is performed on the text. For example, a text sentence segmentation algorithm may be used to mark punctuation marks for the text, for example, symbols such as a comma, a period, a question mark, an exclamation mark, a blank, and the like, where marked as a blank means that no sentence segmentation processing is performed herein. Otherwise, it means that sentence segmentation is needed herein.

Optionally, the text sentence segmentation algorithm may be a classification algorithm obtained based through training based on N labeled text. By classifying an end of each word in the text, where a classification category may include symbols such as a comma, a period, a question mark, an exclamation mark, and a blank, and a value of N is often relatively large, for example, 5000, 10000, 50000, or the like, which may be properly set according to an actual requirement. The text sentence segmentation algorithm may include a conditional random field (CRF) algorithm, a neural network algorithm, or the like, which is not limited in this embodiment.

In this embodiment, by performing sentence segmentation processing on the text, the sentence segmentation locations of the text can be obtained. In this way, in combination with the audio location corresponding to each word in the marked text, the sentence segmentation locations of the first audio can be obtained. For example, as shown in FIG. 2, there is an exclamation mark after the word "Hello" in the text, and an end time point of the word in the audio is the 2rd second, then it can be determined that the 2rd second of the audio is a sentence segmentation location.

In this embodiment, by converting audio into text for sentence segmentation processing, accuracy of a sentence segmentation processing result can be improved. In addition, by marking the audio location corresponding to each word in the text, and determining a sentence segmentation location of the audio based on the audio location corresponding to each word in the text and the sentence segmentation processing result of the text, which is easy and convenient to implement.

Optionally, the first audio is an audio message, and after the segmenting the first audio according to the first location to obtain a second audio segment and a third audio segment, the method further includes:

performing deduplication processing, in a case that the first audio has rear audio, on the rear audio and the second audio segment, and splicing the rear audio and the second audio segment obtained after the deduplication processing to obtain first spliced audio, where the rear audio is a next audio message of the first audio, and an audio object corresponding to the rear audio is the same as an audio object corresponding to the first audio; and performing deduplication processing, in a case that the first audio has front audio, on the front audio and the third audio segment, and splicing the front audio and the third audio segment obtained after the deduplication processing to obtain second spliced audio, where the front audio is a previous audio message of the first audio, and an audio object corresponding to the front audio is the same as the audio object corresponding to the first audio.

In this embodiment, the first audio may be an audio message transmitted through an instant messaging application. The audio object may be understood as a speaking object of the audio.

The rear audio may be understood as an audio message whose corresponding audio object is the same as the audio object corresponding to the first audio, and is located after the first audio and adjacent to the first audio. Specifically, in a case that the next message of the first audio is an audio message and an audio object corresponding to the audio message is the same as the audio object of the first audio, it is determined that the first audio has rear audio, otherwise it is determined that the first audio does not have rear audio. For example, in a case that a next message of an audio message A is an audio message B and an audio object corresponding to the audio message B and an audio object corresponding to the audio message A are both a user B, it is determined that the audio message A has rear audio, that is, the audio message B. In a case that the next message of the audio message A is not an audio message, or the next message of the audio message A is an audio message B but an audio object corresponding to the audio message B is different from the audio object corresponding to the audio message A, it can be determined that the audio message A does not have rear audio.

The front audio may be understood as an audio message whose corresponding audio object is the same as the audio object corresponding to the first audio, and is located before the first audio and adjacent to the first audio. Specifically, in a case that the previous message of the first audio is an audio message and an audio object corresponding to the audio message is the same as the audio object of the first audio, it is determined that the first audio has front audio, otherwise it is determined that the first audio does not have front audio. For example, in a case that a previous message of the audio message A is an audio message C and an audio object corresponding to the audio message C and the audio object corresponding to the audio message A are both a user B, it is determined that the audio message A has front audio, that is, the audio message C. In a case that the previous message of the audio message A is not an audio message, or the previous message of the audio message A is the audio message C but the audio object corresponding to the audio message C is different from the audio object corresponding to the audio message A, it is determined that the audio message A has no front audio.

During practical application, an audio message is generally short. For example, a maximum length of an audio message is 60 seconds, and it is often difficult to fully express content that the user needs to convey. Therefore, the user often expresses the content that the user needs to convey by sending a plurality of consecutive audio messages. In this embodiment, the second audio segment in the first audio and the rear audio are spliced, and the third audio segment in the first audio and the front audio are spliced, so that the user can listen to relatively complete audio content based on the spliced audio, which is convenient for the user to operate. In addition, deduplication processing is performed before audio splicing, which can improve smoothness of audio splicing.

Optionally, a time interval between a transmission time of the rear audio and a transmission time of the first audio is less than a first preset time interval, or the transmission time of the rear audio and the transmission time of the first audio are on a same day, and a time interval between a transmission time of the front audio and the transmission time of the first audio is less than a second preset time interval, or the transmission time of the front audio and the transmission time of the first audio are on a same day, which can reduce splicing of two unrelated audio messages.

The first preset time interval and the second preset time interval may be properly set according to an actual requirement, for example, 10 minutes, 5 minutes, or the like. It should be noted that, the transmission time may include a sending time and a receiving time.

Optionally, the performing deduplication processing on the rear audio and the second audio segment may include:

obtaining a fourth audio segment located before a second location of the rear audio and a fifth audio segment located after a third location of the second audio segment, where the second location includes a first sentence segmentation location or a location of a first silent segment of the rear audio, and the third location includes a last sentence segmentation location or a location of a last silent segment of the second audio segment; and deleting, in a case that text corresponding to the fourth audio segment is the same as text corresponding to the fifth audio segment, the fourth audio segment from the rear audio, or the fifth audio segment from the second audio segment; and the performing deduplication processing on the front audio and the third audio segment includes:

obtaining a sixth audio segment after a fourth location of the front audio and a seventh audio segment before a fifth location of the third audio segment, where the fourth location includes a last sentence segmentation location or a location of a last silent segment of the front audio, and the fifth location includes a first sentence segmentation location or a location of a first silent segment of the third audio segment; and deleting, in a case that text corresponding to the sixth audio segment is the same as text corresponding to the seventh audio segment, the sixth audio segment from the front audio, or the seventh audio segment from the third audio segment.

In this embodiment, the audio segment located before the first sentence segmentation location or the location of the first silent segment of the rear audio is the fourth audio segment. For example, as shown in FIG. 2, the first sentence segmentation location of the rear audio is an end location of "Would you like", then the fourth audio segment is an audio segment corresponding to "Would you like" in the rear audio. The audio segment located after the last sentence segmentation location or the location of the last silent segment of the third audio segment is the fifth audio segment. For example, as shown in FIG. 2, the last sentence segmentation location of the first audio is a start location of "Would you like", then the fifth audio segment is an audio segment corresponding to "Would you like" in the first audio.

Specifically, in a case that the text corresponding to the fourth audio segment is the same as the text corresponding to the fifth audio segment, the fourth audio segment may be deleted from the rear audio. For example, as shown in FIG. 2, the audio segment corresponding to "Would you like" in the rear audio is deleted, and the rear audio whose fourth audio segment is deleted and the second audio segment are spliced; or the fifth audio segment is deleted from the second audio segment. For example, as shown in FIG. 2, the audio segment corresponding to "Would you like" in the first audio is deleted, and the second audio segment whose fifth audio segment is deleted and the rear audio are spliced. In a case that the text corresponding to the fourth audio segment is different from the text corresponding to the fifth audio segment, the second audio segment and the rear audio may be directly spliced.

Similarly, the audio segment located after the last sentence segmentation location or the location of the last silent segment of the front audio is the sixth audio segment. The audio segment located before the first sentence segmentation location or the location of the first silent segment of the third audio segment is the seventh audio segment. As shown in FIG. 2, the first sentence segmentation location of the first audio is an end location of "Hello", then the seventh audio segment is an audio segment corresponding to "Hello" in the first audio.

Specifically, in a case that the text corresponding to the sixth audio segment is the same as the text corresponding to the seventh audio segment, the sixth audio segment may be deleted from the front audio, and the front audio whose sixth audio segment is deleted and the third audio segment are spliced; or the seventh audio segment is deleted from the third audio segment, and the third audio segment whose seventh audio segment is deleted and the front audio are spliced. In a case that the text corresponding to the sixth audio segment is different from the text corresponding to the seventh audio segment, the third audio segment and the front audio may be directly spliced.

In this embodiment, based on the first sentence segmentation location or the location of the first silent segment of the rear audio, and the last sentence segmentation location or the location of the last silent segment of the second audio segment, a repeated audio segment of the rear audio and the second audio segment is determined, and based on the last sentence segmentation location or the location of the last silent segment of the front audio and the first sentence segmentation location or the location of the first silent segment of the third audio segment, a repeated audio segment of the front audio and the third audio segment is determined, which can quickly and accurately determine a repeated audio segment, thereby improving speed and accuracy of deduplication processing.

Optionally, after the splicing the rear audio and the second audio segment obtained after the deduplication processing to obtain first spliced audio, the method further includes:

displaying the first spliced audio in a message display window, and canceling display of the rear audio and the second audio segment, where the first spliced audio is marked as unread, and a first playback speed adjustment identifier is displayed on the first spliced audio; and after the splicing the front audio and the third audio segment obtained after the deduplication processing to obtain second spliced audio, the method further includes:

displaying the second spliced audio in the message display window, and canceling display of the front audio and the third audio segment, where the second spliced audio is marked as read, and a second playback speed adjustment identifier is displayed on the second spliced audio.

Figure 3:
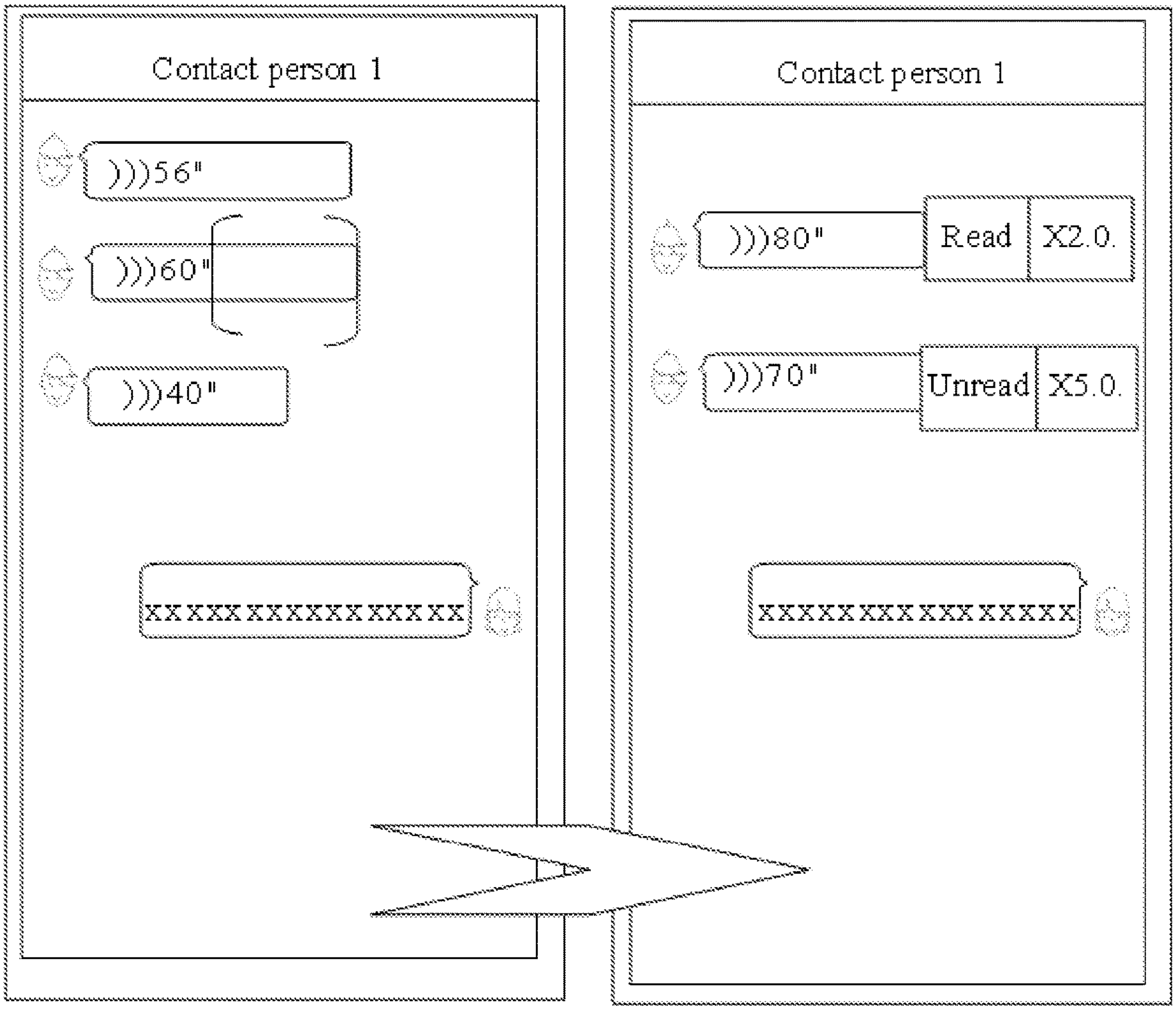
FIG. 3 is a schematic diagram of audio before splicing and audio after splicing according to an embodiment of this application.

In this embodiment, in a case that the first spliced audio is obtained, the first spliced audio may be displayed in the message display window, and display of the rear audio and the second audio segment is displayed, where the first spliced audio is marked as unread, and the first playback speed adjustment identifier is displayed on the first spliced audio; and in a case that the second spliced audio is obtained, the second spliced audio may be displayed in the message display window, and display of the front audio and the third audio segment is canceled, where the second spliced audio is marked as read, and the second playback speed adjustment identifier is displayed on the second spliced audio, for example, as shown in FIG. 3.

The first playback speed adjustment identifier is used to adjust a playback speed of the first spliced audio, and can, in a case that first input for the first playback speed adjustment identifier is received, adjust the playback speed of the first spliced audio to be a playback speed corresponding to the first playback speed adjustment identifier. The second playback speed adjustment identifier is used to adjust a playback speed of the second spliced audio, and can, in a case that second input for the second playback speed adjustment identifier is received, adjust the playback speed of the second spliced audio to be a playback speed corresponding to the second playback speed adjustment identifier.

Optionally, both the first playback speed adjustment identifier and the second playback speed adjustment identifier may include at least one playback speed sub-identifier, and each playback speed sub-identifier corresponds to a playback speed. For example, both the first playback speed adjustment identifier and the second playback speed adjustment identifier may include at least one of a playback speed sub-identifier for 1.5 times playback, a playback speed sub-identifier for 2 times playback, and a playback speed sub-identifier for 3 times playback.

In this embodiment of this application, after the rear audio and the second audio segment obtained after the deduplication processing are spliced to obtain first spliced audio, the first spliced audio is displayed in the message display window, and display of the rear audio and the second audio segment is canceled, where the first spliced audio is marked as unread, and the first playback speed adjustment identifier is displayed on the first spliced audio; and after the front audio and the third audio segment obtained after the deduplication processing are spliced to obtain the second spliced audio, the second spliced audio is displayed in the message display window, and display of the front audio and the third audio segment is canceled, where the second spliced audio is marked as read, and the second playback speed adjustment identifier is displayed on the second spliced audio. In this way, it is convenient for the user to intuitively distinguish the played audio segment and the unplayed audio segment, and can then quickly perform a playback selection and flexibly adjust the playback speed of the audio message, which saves the time for the user to listen to the audio message.

Optionally, in a case that the first audio does not have rear audio, the second audio segment may be directly marked as unread, and a third playback speed adjustment identifier may be displayed on the second audio segment, where the third playback speed adjustment identifier may be used to adjust the playback speed of the second audio segment; and in a case that the first audio does not have front audio, the third audio segment may be directly marked as read, and a fourth playback speed adjustment identifier may be displayed on the third audio segment, where the fourth playback speed adjustment identifier may be used to adjust the playback speed of the third audio segment. In this way, it is convenient for the user to intuitively distinguish the played audio segment and the unplayed audio segment, and can then quickly perform a playback selection and flexibly adjust the playback speed of the audio message, which saves the time for the user to listen to the audio message.

Optionally, in this embodiment of this application, in a case that playback input for target audio is received, text corresponding to the target audio can be recognized; semantic understanding is performed on the text corresponding to the target audio, and target background music is determined based on a semantic understanding result; and the target background music is played during a process of playing the target audio.

The target audio may be any audio, audio segment, or spliced audio. The target background music may be music that matches the semantic understanding result of the text corresponding to the target audio. For example, in a case that the semantic understanding result of the text corresponding to the target audio indicates that the target audio is birthday wishes, the target background music may be a song related to birthday wishes. In a case that the semantic understanding result of the text corresponding to the target audio indicates that the target audio is a travel plan, then the target background music may be a song related to travel.

In this embodiment of this application, by playing background music that matches content of the audio during audio playback, an effect and interest of audio playback can be improved.

Figure 4:
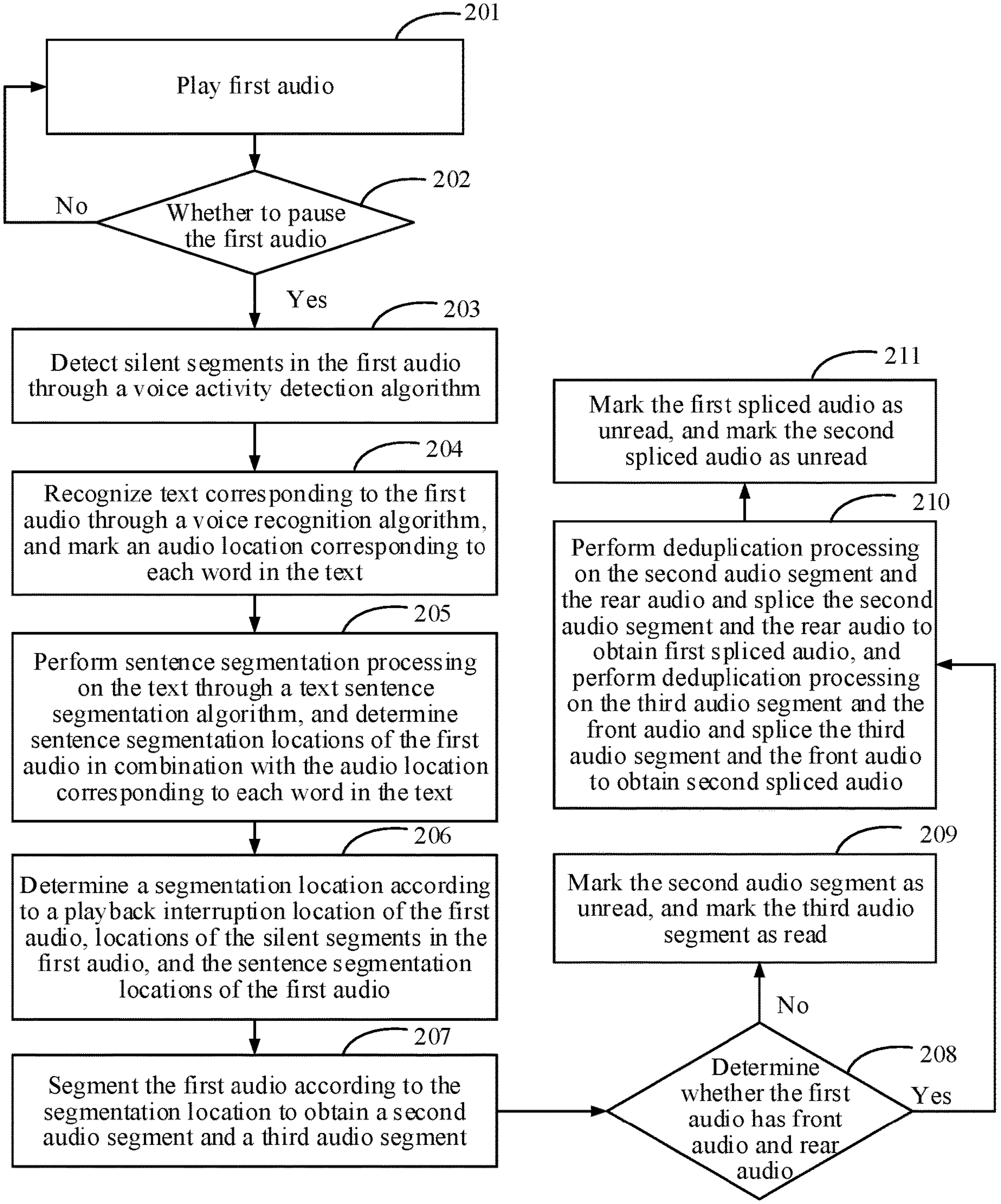
FIG. 4 is a flowchart of an audio processing method according to another embodiment of this application.

Referring to FIG. 4, FIG. 4 is a flowchart of an audio processing method according to another embodiment of this application.

As shown in FIG. 4, the audio processing method provided in this embodiment of this application includes the following steps:

Step 201. Play first audio.

Step 202. Whether to pause the first audio.

In a case that the first audio is paused, an interruption playback location of the first audio may be recorded, and step 203 is performed; otherwise, the first audio continues to be played.

Step 203. Detect silent segments in the first audio through a voice activity detection algorithm.

In this step, the VAD algorithm can classify frames in the audio into two types, one type is silent frames (that is sil frames), and the other type is non-silent frames, and a silent part whose duration exceeds preset duration is determined as a silent segment.

Step 204. Recognize text corresponding to the first audio through a voice recognition algorithm, and mark an audio location corresponding to each word in the text.

In this step, the text corresponding to the first audio is recognized through the voice recognition algorithm, and the audio location corresponding to each word in the text is marked, that is, a start time point and an end time point of each word in the first audio are marked.

Step 205. Perform sentence segmentation processing on the text through a text sentence segmentation algorithm, and determine sentence segmentation locations of the first audio in combination with the audio location corresponding to each word in the text.

In this step, punctuation marks may be marked for the text according to the text sentence segmentation algorithm, for example, symbols such as a comma, a period, a question mark, an exclamation mark, a blank, and the like, where marked as a blank means that no sentence segmentation processing is performed. Otherwise, it means that sentence segmentation is needed herein. After sentence segmentation locations of the text are obtained, the sentence segmentation locations of the first audio may be obtained in combination with the audio location corresponding to each word in the marked text.

Step 206. Determine a segmentation location according to a playback interruption location of the first audio, locations of the silent segments in the first audio, and the sentence segmentation locations of the first audio.

In this step, a sentence segmentation location or an end location of a silent segment that is closest to the playback interruption location in a played audio segment of the first audio (that is, the first audio segment) may be searched. For example, each word that is located before the playback interruption location in the played audio segment may be viewed. If an end location of a previous word of the playback interruption location is a sentence segmentation location, or the previous word is a silent word, an end moment of the previous word may be used as a segmentation location of the audio.

Step 207. Segment the first audio according to the segmentation location to obtain a second audio segment and a third audio segment.

In this step, the second audio segment is an audio segment between the segmentation location of the first audio and an end location of the first audio, and the third audio segment is an audio segment between a start location of the first audio and the segmentation location of the first audio.

Step 208. Determine whether the first audio has front audio and rear audio.

In this step, in a case that the first audio has front audio and rear audio, step 210 is performed, or in a case that the first audio does not have front audio or rear audio, step 209 is performed. In a case that the first audio has rear audio but does not have front audio, the third audio segment may be marked as read, and the second audio segment and the rear audio are deduplicated and spliced to obtain first spliced audio; or in a case that the first audio has front audio but does not have rear audio, the second audio segment may be marked as unread, and the third audio segment and the front audio are deduplicated and spliced to obtain second spliced audio.

Step 209. Mark the second audio segment as unread, and mark the third audio segment as read.

Step 210. Perform deduplication processing on the second audio segment and the rear audio and splice the second audio segment and the rear audio to obtain the first spliced audio, and perform deduplication processing on the third audio segment and the front audio and splice the third audio segment and the front audio to obtain the second spliced audio.

In this step, for performing deduplication processing on the second audio segment and rear audio and performing deduplication processing on the third audio segment and front audio, reference may be made to foregoing relevant descriptions, and details are not repeated herein.

Step 211. Mark the first spliced audio as unread, and mark the second spliced audio as unread.

In this embodiment of this application, a playback interruption point can be automatically adjusted through the voice activity detection algorithm, voice recognition algorithm, and text sentence segmentation algorithm, so that audio after the interruption point is relatively complete, and it is convenient to continue to listen to previous audio next time. In addition, in this embodiment of this application, repeated audio may be removed during an audio splicing process, which can increase smoothness of splicing two pieces of audio and facilitate listening.

It should be noted that, the audio processing method provided in this embodiment of this application may be performed by an audio processing apparatus, or a control module configured to perform the audio processing method in the audio processing apparatus. In this embodiment of this application, the audio processing apparatus provided in this embodiment of this application is described by using an example in which the audio processing apparatus performs the audio processing method.

Figure 5:
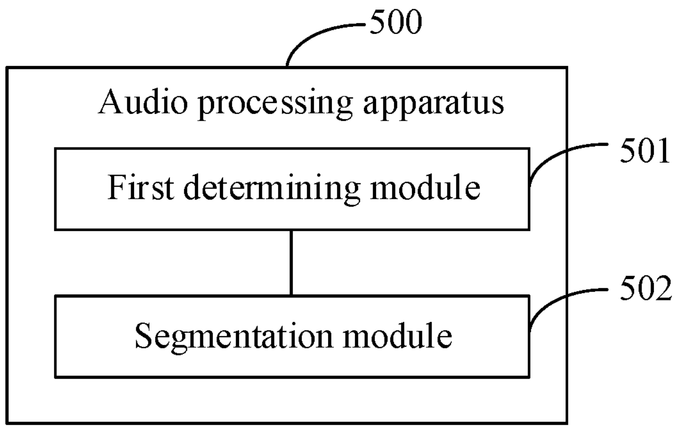
FIG. 5 is a structural diagram of an audio processing apparatus according to an embodiment of this application.

Referring to FIG. 5, FIG. 5 is a structural diagram of an audio processing apparatus according to an embodiment of this application. As shown in FIG. 5, the audio processing apparatus 500 includes:

- a first determining module 501, configured to determine, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and
- a segmentation module 502, configured to segment the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio.

Optionally, the first location is a sentence segmentation location or an end location of a silent segment that is away from the playback interruption location by a first distance in the first audio segment, and the first distance is a smallest value among distances between sentence segmentation locations and end locations of silent segments of the first audio segment and the playback interruption location.

Optionally, the apparatus further includes:

a recognition module, configured to recognize text corresponding to the first audio before determining the first location of the first audio according to the playback interruption location of the first audio, the sentence segmentation locations of the first audio, and the locations of the silent segments of the first audio in a case that playback interruption of the first audio is detected;

a marking module, configured to mark an audio location corresponding to each word in the text;

a sentence segmentation module, configured to perform sentence segmentation processing on the text to obtain a sentence segmentation processing result; and a second determining module, configured to determine the sentence segmentation locations of the first audio according to the sentence segmentation processing result and the audio location corresponding to each word in the text.

Optionally, the first audio is an audio message, and the apparatus further includes at least one of the following:

a first processing module, configured to, after the segmenting the first audio according to the first location to obtain a second audio segment and a third audio, perform deduplication processing, in a case that the first audio has rear audio, the rear audio and the second audio segment, and splice the rear audio and the second audio segment obtained after the deduplication processing to obtain first spliced audio, where the rear audio is a next audio message of the first audio, and an audio object corresponding to the rear audio is the same as an audio object corresponding to the first audio; and a second processing module, configured to perform deduplication processing, in a case that the first audio has front audio, the front audio and the third audio segment, and splice the front audio and the third audio segment obtained after the deduplication processing to obtain second spliced audio, where the front audio is a previous audio message of the first audio, and an audio object corresponding to the front audio is the same as the audio object corresponding to the first audio.

Optionally, the first processing module is further configured to:

obtain a fourth audio segment located before a second location of the rear audio and a fifth audio segment located after a third location of the second audio segment, where the second location includes a first sentence segmentation location or a location of a first silent segment of the rear audio, and the third location includes a last sentence segmentation location or a location of a last silent segment of the second audio segment; and delete, in a case that text corresponding to the fourth audio segment is the same as text corresponding to the fifth audio segment, the fourth audio segment from the rear audio, or the fifth audio segment from the second audio segment; and the second processing module is further configured to:

obtain a sixth audio segment after a fourth location of the front audio and a seventh audio segment before a fifth location of the third audio segment, where the fourth location includes a last sentence segmentation location or a location of a last silent segment of the front audio, and the fifth location includes a first sentence segmentation location or a location of a first silent segment of the third audio segment; and delete, in a case that text corresponding to the sixth audio segment is the same as text corresponding to the seventh audio segment, the sixth audio segment from the front audio, or the seventh audio segment from the third audio segment.

Optionally, the apparatus further includes:

a first display module, configured to, after the rear audio and the second audio segment obtained after the deduplication processing are spliced to obtain first spliced audio, display the first spliced audio in a message display window, and cancel display of the rear audio and the second audio segment, where the first spliced audio is marked as unread, and a first playback speed adjustment identifier is displayed on the first spliced audio; and a second display module, configured to, after the front audio and the third audio segment obtained after the deduplication processing are spliced to obtain second spliced audio, display the second spliced audio in the message display window, and cancel display of the front audio and the third audio segment, where the second spliced audio is marked as read, and a second playback speed adjustment identifier is displayed on the second spliced audio.

The audio processing apparatus in the embodiments of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which is not specifically limited in the embodiments of this application.

The audio processing apparatus in the embodiments of this application may be an apparatus with an operating system. The operating system may be an Android operating system, may be an iOS operating system, or may be another possible operating system, which is not specifically limited in the embodiments of this application.

The audio processing apparatus provided in the embodiments of this application can implement various processes in the foregoing method embodiments. To avoid repetition, details are not described herein again.

In the audio processing apparatus 500 provided in the embodiments of this application, the first determining module 501 is configured to determine, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and the segmentation module 502 is configured to segment the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio. Since the audio is segmented based on the sentence segmentation location or the end location of the silent segment determined according to the playback interruption location, integrity of an audio segment obtained after segmentation can be improved.

Figure 6:
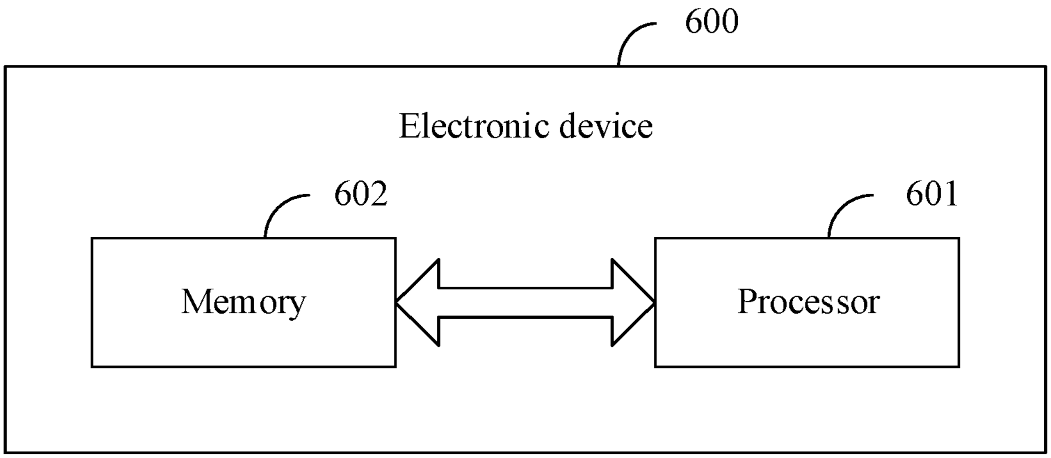
FIG. 6 is a structural diagram of an electronic device according to an embodiment of this application.

Optionally, as shown in FIG. 6, an embodiment of this application further provides an electronic device 600, including a processor 601, a memory 602, and a program or instructions stored in the memory 602 and executable on the processor 601, where when executed by the processor 601, the program or the instructions implement the processes of the embodiments of the audio processing method, and can achieve the same technical effects. To avoid repetition, details are not described herein again.

It should be noted that, the electronic device in this embodiment of this application includes the foregoing mobile electronic device and non-mobile electronic device.

Figure 7:
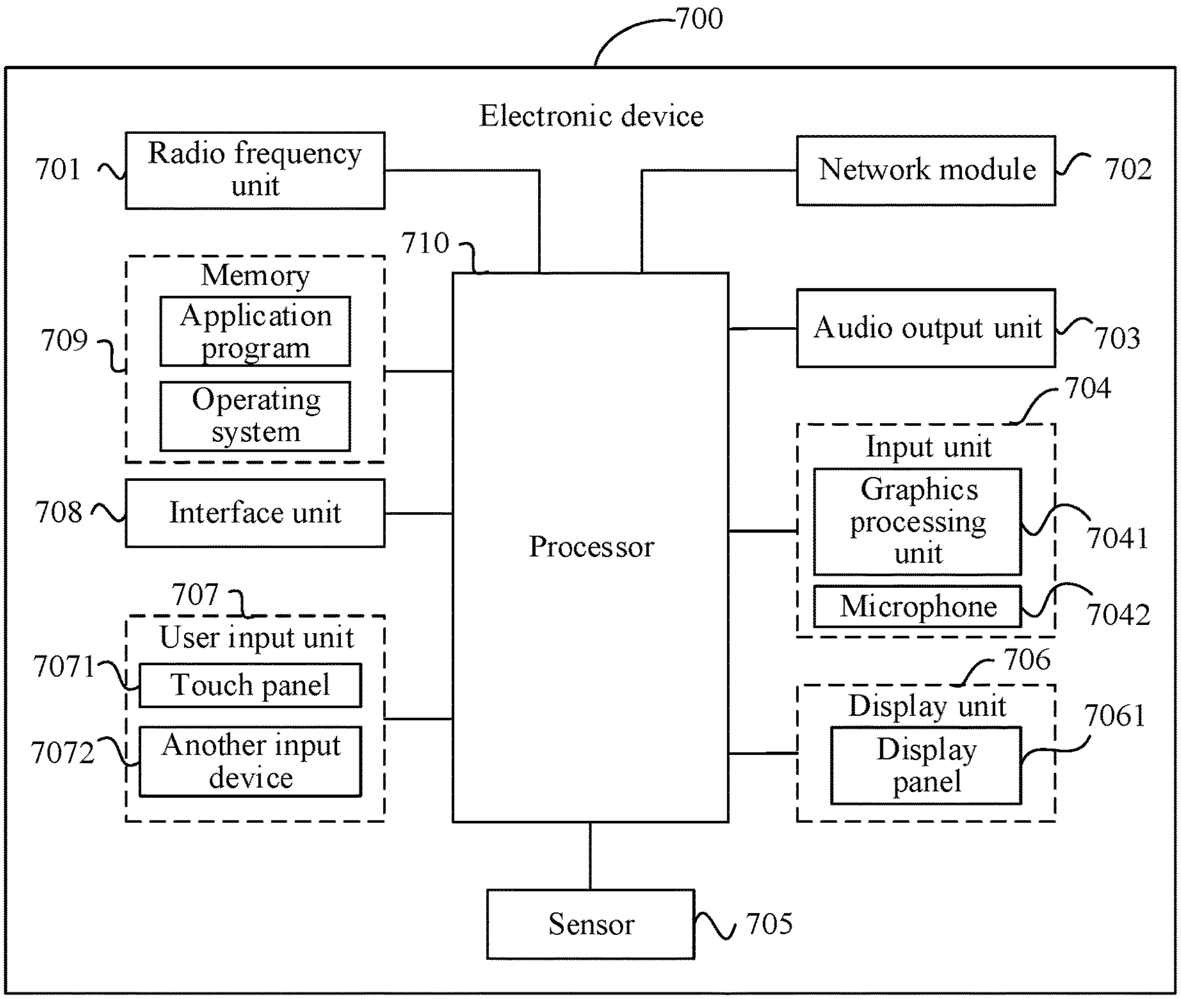
FIG. 7 is a structural diagram of an electronic device according to another embodiment of this application.

Referring to FIG. 7, FIG. 7 is a structural diagram of an electronic device according to another embodiment of this application. As shown in FIG. 7, the electronic device 700 includes but is not limited to: components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the electronic device 700 may further include a power supply (such as a battery) for supplying power to the components. The power supply may be logically connected to the processor 710 by using a power supply management system, thereby implementing functions such as charging, discharging, and power consumption management by using the power supply management system. A structure of the electronic device shown in FIG. 7 constitutes no limitation on the electronic device, and the electronic device may include more or fewer components than those shown in the figure, or some components may be combined, or a different component deployment may be used. Details are not described herein again.

The processor 710 is configured to determine, in a case that playback interruption of first audio is detected, a first location of the first audio according to a playback interruption location of the first audio, sentence segmentation locations of the first audio, and locations of silent segments of the first audio, where the first location is a sentence segmentation location or an end location of a silent segment of a first audio segment located in the first audio, and the first audio segment is an audio segment between a start location of the first audio and the playback interruption location of the first audio; and segment the first audio according to the first location to obtain a second audio segment and a third audio segment, where the second audio segment is an audio segment between the first location of the first audio and an end location of the first audio, and the third audio segment is an audio segment between the start location of the first audio and the first location of the first audio.

Optionally, the first location is a sentence segmentation location or an end location of a silent segment that is away from the playback interruption location by a first distance in the first audio segment, and the first distance is a smallest value among distances between sentence segmentation locations and end locations of silent segments of the first audio segment and the playback interruption location.

Optionally, the processor 710 is further configured to:

recognize text corresponding to the first audio before recognizing the first location closest to the playback interruption location of the first audio in the first audio segment of the first audio in a case that playback interruption of the first audio is detected;

mark an audio location corresponding to each word in the text;

perform sentence segmentation processing on the text to obtain a sentence segmentation processing result; and determine the sentence segmentation locations of the first audio according to the sentence segmentation processing result and the audio location corresponding to each word in the text.

Optionally, the processor 710 is further configured to:

in a case that the first audio is an audio message, perform deduplication processing on the rear audio and the second audio segment, and splice the rear audio and the second audio segment obtained after the deduplication processing to obtain first spliced audio after segmenting the first audio according to the first location to obtain the second audio segment and the third audio in a case that the first audio has rear audio; where the rear audio is a next audio message of the first audio, and an audio object corresponding to the rear audio is the same as an audio object corresponding to the first audio; and perform deduplication processing, in a case that the first audio has front audio, on the front audio and the third audio segment, and splice the front audio and the third audio segment obtained after the deduplication processing to obtain second spliced audio, where the front audio is a previous audio message of the first audio, and an audio object corresponding to the front audio is the same as the audio object corresponding to the first audio.

Optionally, the processor 710 is further configured to:

obtain a fourth audio segment located before a second location of the rear audio and a fifth audio segment located after a third location of the second audio segment, where the second location includes a first sentence segmentation location or a location of a first silent segment of the rear audio, and the third location includes a last sentence segmentation location or a location of a last silent segment of the second audio segment;

delete, in a case that text corresponding to the fourth audio segment is the same as text corresponding to the fifth audio segment, the fourth audio segment from the rear audio, or the fifth audio segment from the second audio segment; and obtain a sixth audio segment after a fourth location of the front audio and a seventh audio segment before a fifth location of the third audio segment, where the fourth location includes a last sentence segmentation location or a location of a last silent segment of the front audio, and the fifth location includes a first sentence segmentation location or a location of a first silent segment of the third audio segment; and delete, in a case that text corresponding to the sixth audio segment is the same as text corresponding to the seventh audio segment, the sixth audio segment from the front audio, or the seventh audio segment from the third audio segment.

Optionally, the display unit 706 is configured to:

after the rear audio and the second audio segment obtained after the deduplication processing are spliced to obtain first spliced audio, display the first spliced audio in a message display window, and cancel display of the rear audio and the second audio segment, where the first spliced audio is marked as unread, and a first playback speed adjustment identifier is displayed on the first spliced audio; and after the front audio and the third audio segment obtained after the deduplication processing are spliced to obtain the second spliced audio, display the second spliced audio in the message display window, and cancel display of the front audio and the third audio segment, where the second spliced audio is marked as read, and a second playback speed adjustment identifier is displayed on the second spliced audio.

In should be understood that, in this embodiment of this application, the input unit 704 may include a graphics processing unit (GPU) 7041 and a microphone 7042. The graphics processing unit 7041 performs processing on image data of a static picture or a video that is obtained by an image acquisition device (for example, a camera) in a video acquisition mode or an image acquisition mode. The display unit 706 may include a display panel 7061, and the display panel 7061 may be configured in a form such as a liquid crystal display or an organic light-emitting diode. The user input unit 707 may include a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (such as a volume control key or a switch key), a track ball, a mouse, and a joystick, which are not described herein in detail again. The memory 709 may be configured to store a software program and various data, and includes but is not limited to an application program and an operating system. The processor 710 may integrate an application processor and a modem processor. The application processor mainly processes an operating system, a user interface, an application program, and the like. The modem processor mainly processes wireless communication. It may be understood that the modem processor may not be integrated into the processor 710.

The embodiments of this application further provide a readable storage medium, storing a program or instructions, the program or the instructions, when executed by a processor, implementing the processes of the embodiments of the audio processing method, and the same technical effects can be achieved. To avoid repetition, details are not repeated herein again.

The processor is a processor in the electronic device in the foregoing embodiments. The readable storage medium includes a computer-readable storage medium, for example, a computer read-only memory (ROM), a random access memory (RAM), a magnetic disk, or an optical disc.

The embodiments of this application further provide a chip, including a processor and a communication interface, the communication interface is coupled to the processor, the processor is configured to run a program or instructions to implement the processes of the embodiments of the audio processing method, and the same technical effects can be achieved. To avoid repetition, details are not described herein again.

It should be understood that, the chip mentioned in the embodiments of this application may also be referred to as a system-level chip, a system chip, a chip system, a system on chip, or the like.

The embodiments of this application further provide an electronic device, configured to perform the processes of the embodiments of the audio processing method, and the same technical effects can be achieved. To avoid repetition, details are not repeated herein again.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the method and apparatus in the embodiments of this application is not limited to performing functions in the order shown or discussed, and may also include performing functions in a substantially simultaneous manner or in a reverse order according to the functions involved. For example, the described methods may be performed in an order different from that described, and various steps may also be added, omitted, or combined. In addition, features described with reference to some examples may be combined in other examples.

Through the descriptions of the foregoing implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. An audio processing method, comprising:

determining, in a case that it is detected that playback of first audio is interrupted, a first location of the first audio according to a playback interruption location of the first audio and locations of silent segments of the first audio, wherein the first audio is an audio message, the first location is a sentence segmentation location or an end location of a silent segment of a first audio segment located in the first audio, the playback interruption location is a time point or a moment when playback of the first audio is interrupted, the silent segment is a silent part in the first audio, the sentence segmentation location is a segmentation location of sentences in the first audio, and the first audio segment is an audio segment between a start location of the first audio and the playback interruption location of the first audio;

segmenting the first audio according to the first location to obtain a second audio segment and a third audio segment, wherein the second audio segment is an audio segment between the first location of the first audio and an end location of the first audio, and the third audio segment is an audio segment between the start location of the first audio and the first location of the first audio;

wherein after the segmenting the first audio according to the first location to obtain a second audio segment and a third audio segment, the method further comprises:

performing deduplication processing, in a case that the first audio has rear audio, on the rear audio and the second audio segment, and splicing the rear audio and the second audio segment obtained after the deduplication processing to obtain first spliced audio, wherein the rear audio is a next audio message of the first audio, and an audio object corresponding to the rear audio is the same as an audio object corresponding to the first audio; and performing deduplication processing, in a case that the first audio has front audio, on the front audio and the third audio segment, and splicing the front audio and the third audio segment obtained after the deduplication processing to obtain second spliced audio, wherein the front audio is a previous audio message of the first audio, and an audio object corresponding to the front audio is the same as the audio object corresponding to the first audio; and wherein after the splicing the rear audio and the second audio segment obtained after the deduplication processing to obtain first spliced audio, the method further comprises:

displaying the first spliced audio in a message display window, and canceling display of the rear audio and the second audio segment, wherein the first spliced audio is marked as unread, and a first playback speed adjustment identifier is displayed on the first spliced audio; and after the splicing the front audio and the third audio segment obtained after the deduplication processing to obtain second spliced audio, the method further comprises:

displaying the second spliced audio in the message display window, and canceling display of the front audio and the third audio segment, wherein the second spliced audio is marked as read, and a second playback speed adjustment identifier is displayed on the second spliced audio.

2. The method according to claim 1, wherein the first location is the sentence segmentation location or the end location of the silent segment that is away from the playback interruption location by a first distance in the first audio segment, and the first distance is a smallest value among distances between sentence segmentation locations of the first audio segment and the playback interruption location and distances between end locations of silent segments of the first audio segment and the playback interruption location.

3. The method according to claim 1, wherein before the determining, in a case that it is detected that playback of first audio is interrupted, a first location of the first audio according to a playback interruption location of the first audio, sentence segmentation locations of the first audio, and locations of silent segments of the first audio, the method further comprises:

recognizing text corresponding to the first audio;

marking an audio location corresponding to each word in the text;

performing sentence segmentation processing on the text to obtain a sentence segmentation processing result; and determining the sentence segmentation locations of the first audio according to the sentence segmentation processing result and the audio location corresponding to each word in the text.

4. The method according to claim 1, wherein the performing deduplication processing on the rear audio and the second audio segment comprises:

obtaining a fourth audio segment located before a second location of the rear audio and a fifth audio segment located after a third location of the second audio segment, wherein the second location comprises a first sentence segmentation location or a location of a first silent segment of the rear audio, and the third location comprises a last sentence segmentation location or a location of a last silent segment of the second audio segment; and deleting, in a case that text corresponding to the fourth audio segment is the same as text corresponding to the fifth audio segment, the fourth audio segment from the rear audio, or the fifth audio segment from the second audio segment; and the performing deduplication processing on the front audio and the third audio segment comprises:

obtaining a sixth audio segment after a fourth location of the front audio and a seventh audio segment before a fifth location of the third audio segment, wherein the fourth location comprises a last sentence segmentation location or a location of a last silent segment of the front audio, and the fifth location comprises a first sentence segmentation location or a location of a first silent segment of the third audio segment; and deleting, in a case that text corresponding to the sixth audio segment is the same as text corresponding to the seventh audio segment, the sixth audio segment from the front audio, or the seventh audio segment from the third audio segment.

5. An electronic device, comprising a processor, a memory, and a program or instructions stored in the memory and executable on the processor, the program or the instructions, when executed by the processor, implementing the following steps:

determining, in a case that it is detected that playback of first audio is interrupted, a first location of the first audio according to a playback interruption location of the first audio and locations of silent segments of the first audio, wherein the first audio is an audio message, the first location is a sentence segmentation location or an end location of a silent segment of a first audio segment located in the first audio, the playback interruption location is a time point or a moment when playback of the first audio is interrupted, the silent segment is a silent part in the first audio, the sentence segmentation location is a segmentation location of sentences in the first audio, and the first audio segment is an audio segment between a start location of the first audio and the playback interruption location of the first audio;

segmenting the first audio according to the first location to obtain a second audio segment and a third audio segment, wherein the second audio segment is an audio segment between the first location of the first audio and an end location of the first audio, and the third audio segment is an audio segment between the start location of the first audio and the first location of the first audio;

wherein after the segmenting the first audio according to the first location to obtain a second audio segment and a third audio segment, the program or the instructions, when executed by the processor, further implement the following steps:

performing deduplication processing, in a case that the first audio has rear audio, on the rear audio and the second audio segment, and splicing the rear audio and the second audio segment obtained after the deduplication processing to obtain first spliced audio, wherein the rear audio is a next audio message of the first audio, and an audio object corresponding to the rear audio is the same as an audio object corresponding to the first audio; and performing deduplication processing, in a case that the first audio has front audio, on the front audio and the third audio segment, and splicing the front audio and the third audio segment obtained after the deduplication processing to obtain second spliced audio, wherein the front audio is a previous audio message of the first audio, and an audio object corresponding to the front audio is the same as the audio object corresponding to the first audio; and wherein after the splicing the rear audio and the second audio segment obtained after the deduplication processing to obtain first spliced audio, the program or the instructions, when executed by the processor, further implement the following steps:

displaying the first spliced audio in a message display window, and canceling display of the rear audio and the second audio segment, wherein the first spliced audio is marked as unread, and a first playback speed adjustment identifier is displayed on the first spliced audio; and after the splicing the front audio and the third audio segment obtained after the deduplication processing to obtain second spliced audio, the program or the instructions, when executed by the processor, further implement the following steps:

displaying the second spliced audio in the message display window, and canceling display of the front audio and the third audio segment, wherein the second spliced audio is marked as read, and a second playback speed adjustment identifier is displayed on the second spliced audio.

6. The electronic device according to claim 5, wherein the first location is the sentence segmentation location or the end location of the silent segment that is away from the playback interruption location by a first distance in the first audio segment, and the first distance is a smallest value among distances between sentence segmentation locations of the first audio segment and the playback interruption location and distances between end locations of silent segments of the first audio segment and the playback interruption location.

7. The electronic device according to claim 5, wherein before the determining, in a case that it is detected that playback of first audio is interrupted, a first location of the first audio according to a playback interruption location of the first audio, sentence segmentation locations of the first audio, and locations of silent segments of the first audio, the program or the instructions, when executed by the processor, further implement the following steps:

recognizing text corresponding to the first audio;

marking an audio location corresponding to each word in the text;

performing sentence segmentation processing on the text to obtain a sentence segmentation processing result; and determining the sentence segmentation locations of the first audio according to the sentence segmentation processing result and the audio location corresponding to each word in the text.

8. The electronic device according to claim 5, wherein the performing deduplication processing on the rear audio and the second audio segment comprises:

obtaining a fourth audio segment located before a second location of the rear audio and a fifth audio segment located after a third location of the second audio segment, wherein the second location comprises a first sentence segmentation location or a location of a first silent segment of the rear audio, and the third location comprises a last sentence segmentation location or a location of a last silent segment of the second audio segment; and deleting, in a case that text corresponding to the fourth audio segment is the same as text corresponding to the fifth audio segment, the fourth audio segment from the rear audio, or the fifth audio segment from the second audio segment; and the performing deduplication processing on the front audio and the third audio segment comprises:

obtaining a sixth audio segment after a fourth location of the front audio and a seventh audio segment before a fifth location of the third audio segment, wherein the fourth location comprises a last sentence segmentation location or a location of a last silent segment of the front audio, and the fifth location comprises a first sentence segmentation location or a location of a first silent segment of the third audio segment; and deleting, in a case that text corresponding to the sixth audio segment is the same as text corresponding to the seventh audio segment, the sixth audio segment from the front audio, or the seventh audio segment from the third audio segment.

9. A non-transitory readable storage medium, storing a program or instructions, the program or the instructions, when executed by a processor, implementing the following steps:

determining, in a case that it is detected that playback of first audio is interrupted, a first location of the first audio according to a playback interruption location of the first audio and locations of silent segments of the first audio, wherein the first audio is an audio message, the first location is a sentence segmentation location or an end location of a silent segment of a first audio segment located in the first audio, the playback interruption location is a time point or a moment when playback of the first audio is interrupted, the silent segment is a silent part in the first audio, the sentence segmentation location is a segmentation location of sentences in the first audio, and the first audio segment is an audio segment between a start location of the first audio and the playback interruption location of the first audio;

segmenting the first audio according to the first location to obtain a second audio segment and a third audio segment, wherein the second audio segment is an audio segment between the first location of the first audio and an end location of the first audio, and the third audio segment is an audio segment between the start location of the first audio and the first location of the first audio;

wherein after the segmenting the first audio according to the first location to obtain a second audio segment and a third audio segment, the program or the instructions, when executed by the processor, further implement the following steps:

performing deduplication processing, in a case that the first audio has rear audio, on the rear audio and the second audio segment, and splicing the rear audio and the second audio segment obtained after the deduplication processing to obtain first spliced audio, wherein the rear audio is a next audio message of the first audio, and an audio object corresponding to the rear audio is the same as an audio object corresponding to the first audio; and performing deduplication processing, in a case that the first audio has front audio, on the front audio and the third audio segment, and splicing the front audio and the third audio segment obtained after the deduplication processing to obtain second spliced audio, wherein the front audio is a previous audio message of the first audio, and an audio object corresponding to the front audio is the same as the audio object corresponding to the first audio; and wherein after the splicing the rear audio and the second audio segment obtained after the deduplication processing to obtain first spliced audio, the program or the instructions, when executed by the processor, further implement the following steps:

displaying the first spliced audio in a message display window, and canceling display of the rear audio and the second audio segment, wherein the first spliced audio is marked as unread, and a first playback speed adjustment identifier is displayed on the first spliced audio; and after the splicing the front audio and the third audio segment obtained after the deduplication processing to obtain second spliced audio, the program or the instructions, when executed by the processor, further implement the following steps:

displaying the second spliced audio in the message display window, and canceling display of the front audio and the third audio segment, wherein the second spliced audio is marked as read, and a second playback speed adjustment identifier is displayed on the second spliced audio.

10. The non-transitory readable storage medium according to claim 9, wherein the first location is the sentence segmentation location or the end location of the silent segment that is away from the playback interruption location by a first distance in the first audio segment, and the first distance is a smallest value among distances between sentence segmentation locations of the first audio segment and the playback interruption location and distances between end locations of silent segments of the first audio segment and the playback interruption location.

11. The non-transitory readable storage medium according to claim 9, wherein before the determining, in a case that it is detected that playback of first audio is interrupted, a first location of the first audio according to a playback interruption location of the first audio, sentence segmentation locations of the first audio, and locations of silent segments of the first audio, the program or the instructions, when executed by the processor, further implement the following steps:

recognizing text corresponding to the first audio;

marking an audio location corresponding to each word in the text;

performing sentence segmentation processing on the text to obtain a sentence segmentation processing result; and determining the sentence segmentation locations of the first audio according to the sentence segmentation processing result and the audio location corresponding to each word in the text.

12. The non-transitory readable storage medium according to claim 9, wherein the performing deduplication processing on the rear audio and the second audio segment comprises:

obtaining a fourth audio segment located before a second location of the rear audio and a fifth audio segment located after a third location of the second audio segment, wherein the second location comprises a first sentence segmentation location or a location of a first silent segment of the rear audio, and the third location comprises a last sentence segmentation location or a location of a last silent segment of the second audio segment; and deleting, in a case that text corresponding to the fourth audio segment is the same as text corresponding to the fifth audio segment, the fourth audio segment from the rear audio, or the fifth audio segment from the second audio segment; and the performing deduplication processing on the front audio and the third audio segment comprises:

obtaining a sixth audio segment after a fourth location of the front audio and a seventh audio segment before a fifth location of the third audio segment, wherein the fourth location comprises a last sentence segmentation location or a location of a last silent segment of the front audio, and the fifth location comprises a first sentence segmentation location or a location of a first silent segment of the third audio segment; and deleting, in a case that text corresponding to the sixth audio segment is the same as text corresponding to the seventh audio segment, the sixth audio segment from the front audio, or the seventh audio segment from the third audio segment.

* * * * *